US009959765B2

(12) United States Patent
Thompson et al.

(10) Patent No.: US 9,959,765 B2
(45) Date of Patent: May 1, 2018

(54) SYSTEM AND METHOD FOR PROVIDING ALERT TO A VEHICLE OR AN ADVANCED DRIVER ASSIST SYSTEM BASED ON VEHICLE DYNAMICS INPUT

(71) Applicant: Dura Operating, LLC, Auburn Hills, MI (US)

(72) Inventors: Aaron Evans Thompson, Grand Blanc, MI (US); Donald Raymond Gignac, Waterford, MI (US); Danish Uzair Siddiqui, Rochester Hills, MI (US); Rajashekhar Patil, Ypsilanti, MI (US); Gordon M. Thomas, Beverly Hills, MI (US)

(73) Assignee: DURA OPERATING LLC, Auburn Hills, MI (US)

( * ) Notice: Subject to any disclaimer, the term of this patent is extended or adjusted under 35 U.S.C. 154(b) by 55 days.

(21) Appl. No.: 15/198,579

(22) Filed: Jun. 30, 2016

(65) Prior Publication Data

US 2017/0025012 A1 Jan. 26, 2017

Related U.S. Application Data

(60) Provisional application No. 62/194,370, filed on Jul. 20, 2015.

(51) Int. Cl.
*B60Q 1/00* (2006.01)
*G08G 1/16* (2006.01)

(52) U.S. Cl.
CPC ............ *G08G 1/162* (2013.01); *G08G 1/163* (2013.01); *G08G 1/166* (2013.01)

(58) Field of Classification Search
None
See application file for complete search history.

(56) References Cited

U.S. PATENT DOCUMENTS 5,680,122 A * 10/1997 Mio .................... G05D 1/0246 180/167
6,356,820 B1 * 3/2002 Hashimoto ............. G08G 1/22 180/167

(Continued)

FOREIGN PATENT DOCUMENTS

WO 2007047476 A2 4/2007

*Primary Examiner* — Curtis King
(74) *Attorney, Agent, or Firm* — Robert E. Ford; Steven L. Crane; Raymond J. Vivacqua

(57) ABSTRACT

A motor vehicle alert system based on vehicle dynamics input includes a communication module positioned in a host vehicle receiving and sending vehicle data in a vehicle mobility data format. A list generator in communication with the communication module generates the vehicle data as specific vehicle identification data in a track list to distinguish a sensed vehicle and at least one other vehicle positioned proximate the host vehicle. A tracker module in communication with the list generator periodically updates the vehicle data for the sensed vehicle and the at least one other vehicle. A transient condition data device generates data identifying when a transient condition of the sensed vehicle is present. A message standard conformance module receives the data identifying the transient condition and forwards the data identifying the transient condition to the communication module for transmission to the at least one other vehicle proximate to the host vehicle.

19 Claims, 3 Drawing Sheets

(56) References Cited

U.S. PATENT DOCUMENTS 7,797,108 B2 * 9/2010 Grimm .................. G08G 1/166 340/435
8,199,046 B2 * 6/2012 Nanami ................ G01S 13/931 340/425.5
8,447,474 B2 * 5/2013 Breed ................. B60R 21/0134 180/169
2006/0291482 A1 * 12/2006 Evans ................. H04W 40/246 370/401
2007/0054685 A1 * 3/2007 Kellum ................. G01S 13/931 455/517
2007/0096885 A1 * 5/2007 Cheng ................... B60W 40/04 340/435
2007/0179701 A1 * 8/2007 Hamilton ............... G01C 21/00 701/36
2007/0276600 A1 * 11/2007 King ...................... G08G 1/042 701/301
2008/0114531 A1 * 5/2008 Kagawa ................. G08G 1/163 701/119
2008/0195284 A1 * 8/2008 Hammadou ........... B60Q 9/006 701/45
2009/0326819 A1 * 12/2009 Taguchi ................ B60W 40/04 701/301
2010/0060485 A1 * 3/2010 Kim ....................... G08G 1/143 340/932.2
2010/0198513 A1 * 8/2010 Zeng ..................... B60W 40/02 701/300
2010/0214085 A1 * 8/2010 Avery .................... G08G 1/161 340/435
2011/0169663 A1 * 7/2011 Stahlin ................... G08G 1/163 340/933
2012/0035846 A1 * 2/2012 Sakamoto ........... B60T 8/17558 701/301
2013/0116915 A1 * 5/2013 Ferreira ................. G08G 1/163 701/117
2013/0181823 A1 * 7/2013 Stahlin ................... B60K 35/00 340/436
2013/0184987 A1 * 7/2013 Armitage ............... G08G 1/163 701/454
2013/0222127 A1 * 8/2013 Ray Avalani .......... B60Q 9/008 340/436
2014/0009275 A1 * 1/2014 Bowers .................... B60Q 1/00 340/436
2014/0063197 A1 * 3/2014 Yamamoto ............. G08G 1/166 348/46
2014/0091911 A1 * 4/2014 Ho ........................... G06K 7/01 340/10.42
2014/0104077 A1 * 4/2014 Engel ................... G08G 1/0962 340/901
2014/0129075 A1 * 5/2014 Carleton ............... B60W 30/00 701/27
2014/0145861 A1 * 5/2014 Goudy ............... G08G 1/09626 340/905
2014/0148998 A1 * 5/2014 Goudy ................... G08G 1/163 701/41
2014/0148999 A1 * 5/2014 Goudy ................... G08G 1/163 701/41
2014/0149031 A1 * 5/2014 Goudy ................... G08G 1/161 701/300
2014/0164582 A1 * 6/2014 Dawson ................ H04W 48/18 709/221
2014/0278045 A1 * 9/2014 Cheng ................... B60W 30/00 701/300
2015/0005983 A1 * 1/2015 Hiroki ................... B60W 40/12 701/1
2015/0032362 A1 * 1/2015 Goudy ................... G08G 1/166 701/301
2015/0035662 A1 * 2/2015 Bowers .................. B60Q 9/008 340/436
2015/0254977 A1 * 9/2015 Grabow ............... G08G 1/0141 340/903
2016/0189547 A1 * 6/2016 Hsu ........................ G08G 1/166 701/70
2016/0295589 A1 * 10/2016 Nikopour .............. H04W 4/023
2016/0358477 A1 * 12/2016 Ansari ................... G08G 1/167
2017/0076605 A1 * 3/2017 Suzuki ................... G08G 1/163

* cited by examiner

SYSTEM AND METHOD FOR PROVIDING ALERT TO A VEHICLE OR AN ADVANCED DRIVER ASSIST SYSTEM BASED ON VEHICLE DYNAMICS INPUT

CROSS REFERENCE TO RELATED APPLICATIONS

The present application claims the benefit of U.S. Provisional Patent application No. 62/194,370, filed on Jul. 20, 2015, the subject matter of which is incorporated herein by reference.

FIELD

The invention relates generally to vehicle automated tracking and notification systems for motor vehicles.

BACKGROUND

The statements in this section merely provide background information related to the present disclosure and may or may not constitute prior art.

Motor vehicle sensing systems are known which can identify to a host vehicle other proximate motor vehicles and warn the driver of the host vehicle of the other vehicle's movements which may intersect the driving path of the host vehicle. Other motor vehicle sensing systems are known which can utilize the data received from the above noted sensing system and institute changes such as to reduce a host vehicle driving speed, apply brakes, provide audio and visual warning signals, and the like. Known systems may utilize camera systems that receive visual data related to the one or more other vehicles and a computer system to perform calculations and generate vehicle command instructions, and LIDAR (light detection and ranging) which relies on laser light to illuminate one or more target vehicles. Other known systems include the vehicle-to-vehicle (V2V) system which allows multiple vehicles to communicate with each other using a predetermined frequency band (e.g., approximately 5.9 GHz).

While vehicle communication and sensing systems are known, such systems lack a warning or alert capability from the host vehicle to other receiving vehicles. This field can therefore benefit from improved vehicle communication system designs.

SUMMARY

According to several aspects, a motor vehicle alert system based on vehicle dynamics input includes a communication module positioned in a host vehicle used to receive and send vehicle data in vehicle mobility data format. A tracker module in communication with the communication module is used to periodically update the vehicle data defining a sensed vehicle and at least one other vehicle proximate to the host vehicle. A transient condition data device in communication with the tracker module identifies when a transient condition of the sensed vehicle is present. A message standard conformance module receives data relating the transient condition of the sensed vehicle and forwards the data to the communication module for transmission to the at least one other vehicle proximate to the host vehicle.

In one aspect, a generate message module receives the data relating the transient condition and converts the data relating the transient condition to a vehicle mobility data format.

In another aspect, a traffic hazardous condition module receives the data relating the transient condition and evaluates if the data relating the transient condition poses a hazardous condition to the at least one other vehicle.

In another aspect, a yaw rate sensor is used to determine a yaw rate of the sensed vehicle.

In another aspect, an inertial measurement unit is used to measure and identify at least an angular rate of the host vehicle and the sensed vehicle.

In another aspect, a list generator in communication with the communication module is used to generate the vehicle data as specific vehicle identification data.

In another aspect, a track list created by the list generator is used to distinguish the sensed vehicle from the at least one other vehicle.

In another aspect, the communication module defines a V2X telematics communication module.

In another aspect, a host vehicle warning device is in communication with the hazardous condition module.

In another aspect, a host vehicle hazardous condition module receives the data relating the transient condition from the transient condition data device.

In another aspect, upon the host vehicle hazardous condition module determining that the data relating the transient condition poses a hazardous condition to the host vehicle a signal from the host vehicle hazardous condition module to the host vehicle warning device notifies the driver of the host vehicle of the transient condition.

According to further aspects, upon the host vehicle hazardous condition module determining that the data relating the transient condition does not pose a hazardous condition to the host vehicle a program step returns to the tracker module.

In another aspect, the communication module includes a V2X dynamics alert message data module for transmitting the transient condition of the sensed vehicle.

In another aspect, a swerve condition is defined when the data relating the transient condition poses a hazardous condition to the at least one other vehicle.

According to further aspects, a motor vehicle alert system based on vehicle dynamics input includes a communication module positioned in a host vehicle used to receive and send vehicle data in vehicle mobility data format. A list generator in communication with the communication module is used to generate the vehicle data as specific vehicle identification data in a track list to distinguish a sensed vehicle and at least one other vehicle positioned proximate to the host vehicle. A tracker module in communication with the list generator is used to periodically update the vehicle data for the sensed vehicle and the at least one other vehicle. A transient condition data device in communication with the tracker module generates data identifying when a transient condition of the sensed vehicle is present. A message standard conformance module receives the data identifying the transient condition of the sensed vehicle and forwards the data identifying the transient condition to the communication module for transmission to the at least one other vehicle proximate to the host vehicle.

In another aspect, a list generator in communication with the communication module is used to generate the vehicle data as specific vehicle identification data; and a track list created by the list generator is used to distinguish the sensed vehicle from the at least one other vehicle.

In another aspect, the communication module and the message standard conformance module are compatible with a vehicle-to-vehicle (V2V) communication system.

In another aspect, a host vehicle hazardous condition module receives the data relating the transient condition from the transient condition data device.

In another aspect, upon the host vehicle hazardous condition module determining that the data relating the transient condition poses a hazardous condition to the host vehicle a signal from the host vehicle hazardous condition module to the host vehicle warning device notifies the driver of the host vehicle of the transient condition; and upon the host vehicle hazardous condition module determining that the data relating the transient condition does not pose a hazardous condition to the host vehicle a program step returns to the tracker module.

According to further aspects, a method for generating and transmitting data identifying a transient condition of motor vehicle, comprises: providing a communication module in a host vehicle used to receive and send vehicle data in vehicle mobility data format; converting the vehicle data in a list generator to specific vehicle identification data in a track list to distinguish a sensed vehicle and at least one other vehicle positioned proximate to the host vehicle; periodically updating the vehicle data for the sensed vehicle and the at least one other vehicle using a tracker module in communication with the list generator; generating transient condition data identifying when a transient condition of the sensed vehicle is present using a transient condition data device in communication with the tracker module; forwarding the transient condition data to a message standard conformance module in the communication module; and transmitting the transient condition data to the at least one other vehicle proximate to the host vehicle.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
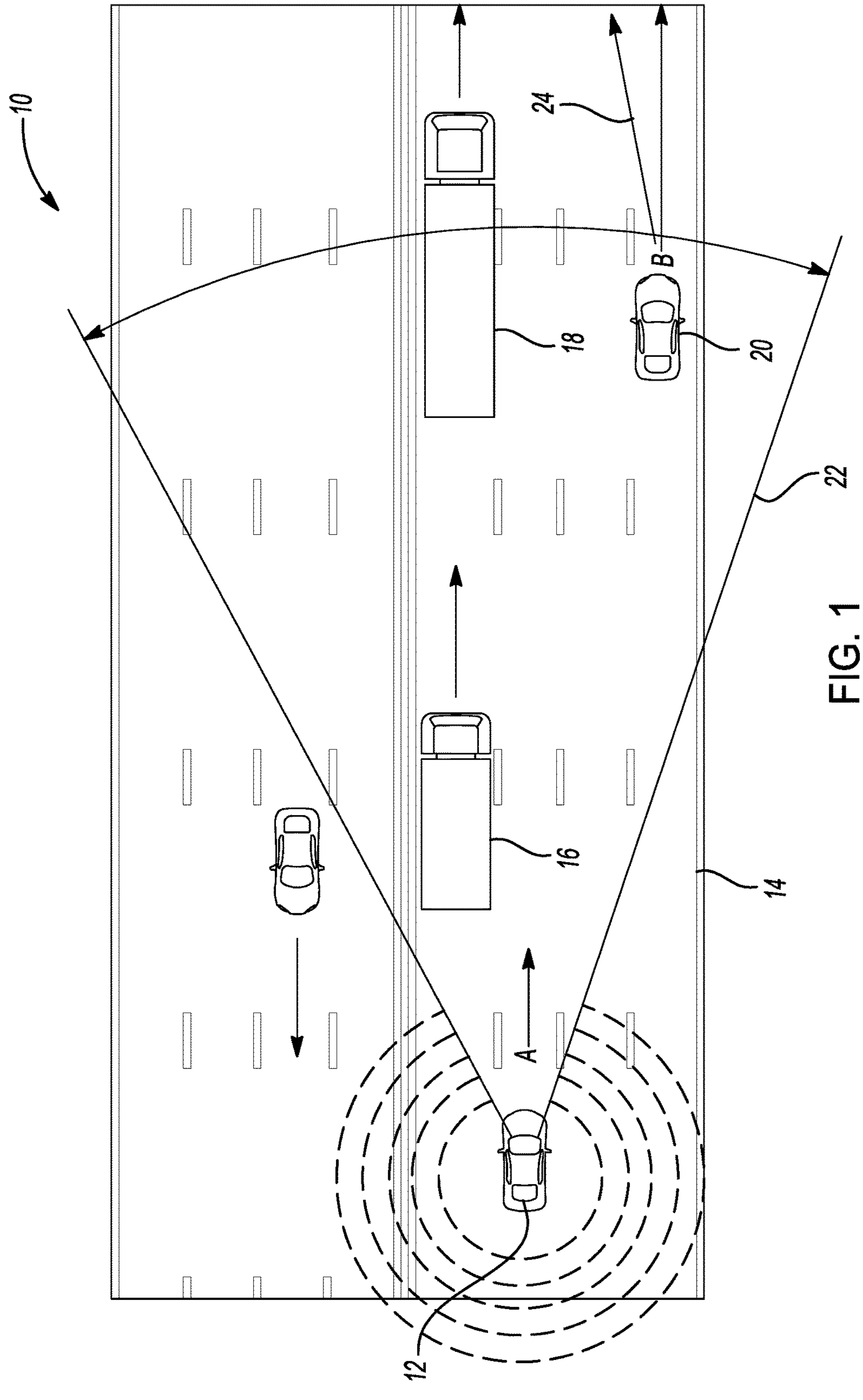
FIG. 1 is a pictorial diagram of a roadway visibility and alert range of a host vehicle using a system and method of providing an alert of the present disclosure.

With reference to FIG. 1, a system and method for providing an alert to a motor vehicle based on vehicle dynamics input is generally indicated with reference to alert system 10. Alert system 10 provides vehicle dynamics data from a host vehicle 12 as it travels on a road or highway 14 in a general path of travel "A" to other vehicles on the highway 14, such as to a first receiving vehicle 16 and a second receiving vehicle 18. The host vehicle 12 and at least the first receiving vehicle 16 and the second receiving vehicle 18 are equipped with a V2V communication system. Alert system 10 can include for example a vision system to identify dynamics data of a sensed vehicle 20 in an immediate vicinity of the host vehicle 12. In this manner the information may be utilized for Advanced Driver Assist (ADAS) technology by utilizing sensors that are in an existing centralized processor. The vehicle dynamics data generated and transmitted by the host vehicle 12 can therefore be received by at least the first receiving vehicle 16 and the second receiving vehicle 18, as well as the sensed vehicle 20.

The vehicle dynamics data can be, for example, telemetry data such as vehicle speed, direction, GPS coordinates, and acceleration or deceleration rates of the sensed vehicle 20 as the sensed vehicle 20 changes from a general path of travel "B", which can be parallel to the path of travel "A" of the host vehicle 12, into or toward a modified path of travel 24. The data representing the path of travel 24 may indicate an intersection with the path of travel "A" of the host vehicle 12, thereby warranting a warning to the host driver of the host vehicle 12 that the sensed vehicle 20 may intersect the path of travel "A". Such data transmission is also defined as a "swerve alert". The data representing the path of travel 24 may also indicate a similar intersection with a path of travel of either or both of the first receiving vehicle 16 and the second receiving vehicle 18. In this condition, the host vehicle 12 can transmit data representing the path of travel 24 to the first receiving vehicle 16 and the second receiving vehicle 18. In addition to the first receiving vehicle 16 and the second receiving vehicle 18, the host vehicle can similarly transmit similar data to any vehicle traveling within a predefined window 22.

Referring to FIG. 2 and again to FIG. 1, alert system 10 functions to send and receive data in a vehicle mobility data format, for example such as Basic Safety Message (BSM) format, which is provided in accordance with SAE J2735 BSM. Vehicle mobility data 26 can include items such as latitude, longitude, time, heading angle, speed, lateral acceleration, longitudinal acceleration, yaw rate, throttle position, brake status, steering angle, headlight status, wiper status, external temperature, turn signal status, vehicle length, vehicle width, vehicle mass, and bumper height. The vehicle mobility data 26 is received via an antenna system 28 of the host vehicle 12 and is communicated to a V2X telematics communication module 30. In the V2X telematics communication module 30, the vehicle mobility data 26 is converted to V2X data 32. In a following step, using a list generator 34, the V2X data 32 is used to create a track list 58 (shown in FIG. 3) of the data representing the status of each of the various vehicles within the predefined window 22, such as the first receiving vehicle 16, the second receiving vehicle 18 and the sensed vehicle 20.

In an update traffic cluster steady state tracker module 36, the data from the list generator 34 is periodically updated at predefined intervals of time for each of the vehicles within the predefined window 22. At periodic intervals, in a traffic hazardous condition module 38, if data from any of the tracked vehicles within the predefined window 22 varies beyond predefined limits, a transient condition, such as a swerve condition is identified. In the traffic hazardous condition module 38 if the response to the query is "NO", indicating a transient condition is not present, the program returns to the update traffic cluster steady state tracker module 36. In the traffic hazardous condition module 38 if the response to the query is "YES", indicating a transient condition is present, the program transfers to an identification step 42. In the identification step 42, the transient condition, for example data indicating a swerve condition of the sensed vehicle 20 is evaluated against the data of the remaining vehicles within the predefined window 22. If the result of the analyses conducted in identification step 42 is "NO" indicating the swerve condition of the sensed vehicle 20 is not hazardous to the other vehicles within the predefined window 22, the program returns to the update traffic cluster steady state tracker module 36.

If the result of the analyses conducted in identification step 42 is "YES" indicating the swerve condition of the sensed vehicle 20 may be hazardous to the other vehicles within the predefined window 22, the program generates a warning message and converts the warning message to a standard format for vehicle mobility data in a message standard conformance step 48.

Figure 2:
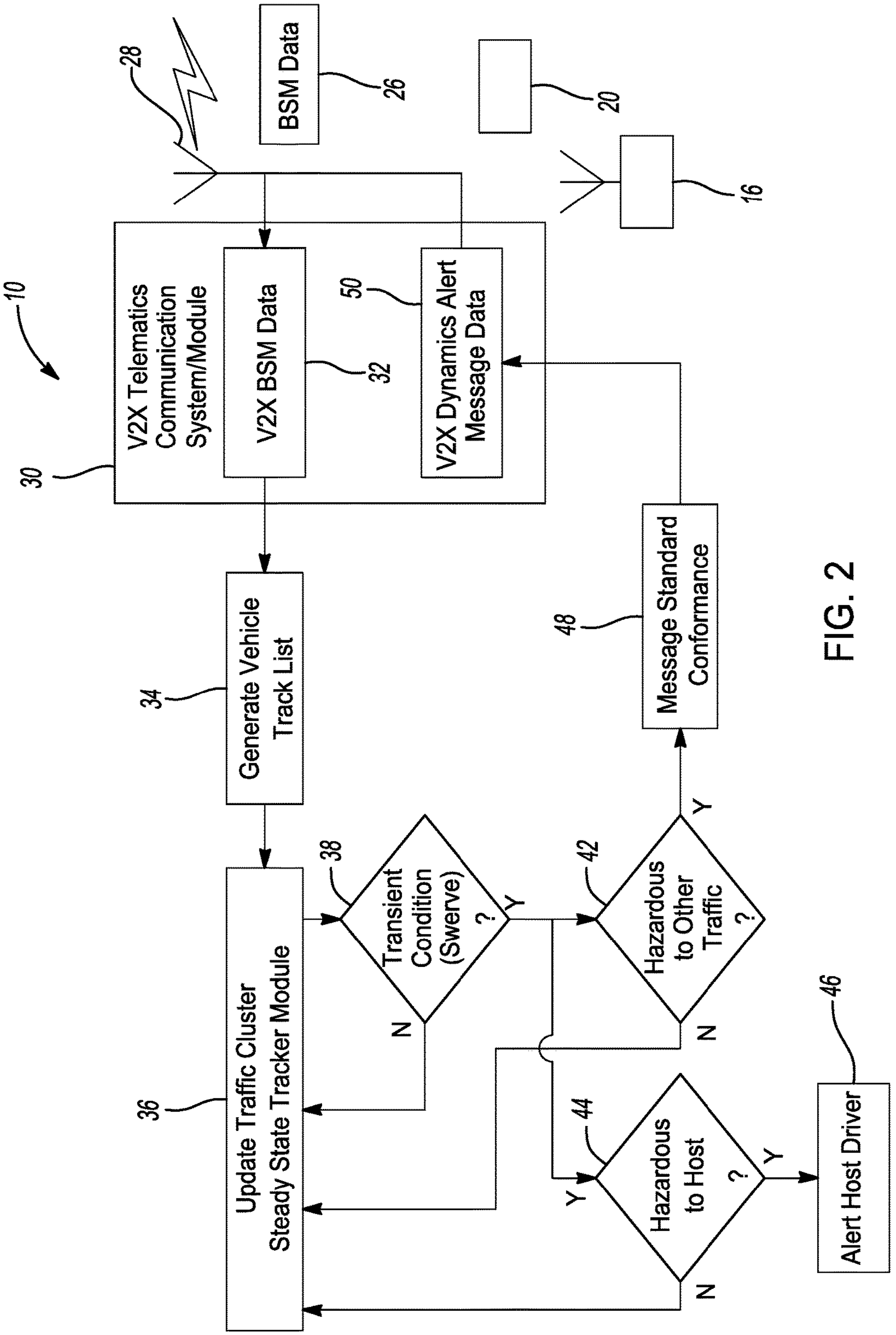
FIG. 2 is a diagrammatic flowchart of the system and method of providing an alert of FIG. 1.

Referring to FIG. 3 and again to FIGS. 1 through 2, according to several aspects, the alert system 10 can utilize vehicle sensors such as a yaw rate sensor 52 or an inertial measurement unit 54 in conjunction with a vehicle position identified for example using GPS coordinates, to generate a steady state estimation model of traffic flow. From the steady state model, the alert system 10 identifies a transient condition or response attributed to each of the vehicle signals tracked by the host vehicle 12, otherwise known as a "swerve alert". The information generated by the algorithms or methods can be utilized and include multi-lane highway and expressways where a congregation of vehicles travel synchronously.

Figure 3:
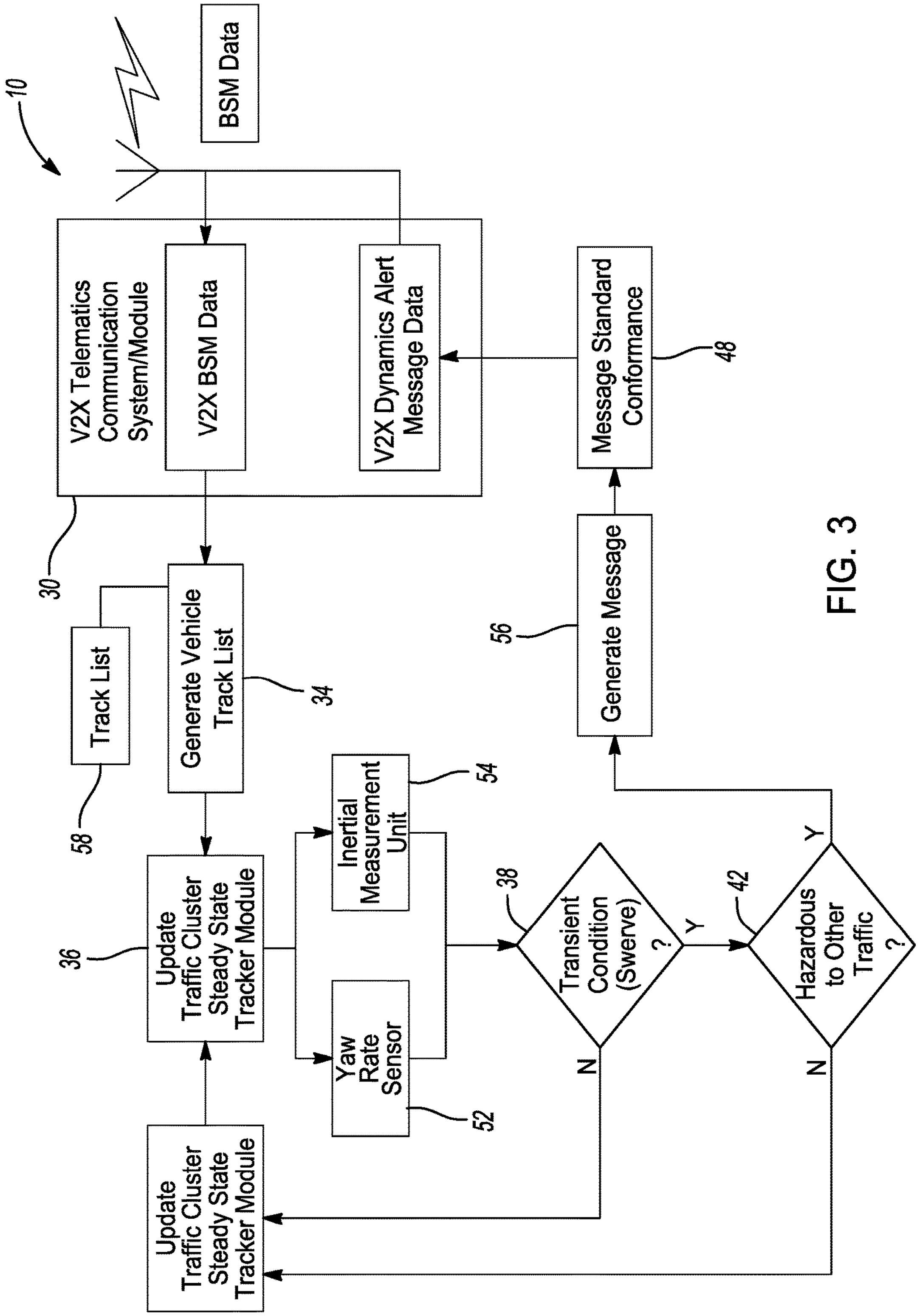
FIG. 3 is a diagrammatic flowchart modified from FIG. 2.

With continuing reference to FIG. 3, if the result of the analyses conducted in the identification step 42 is "YES", indicating the swerve condition of the sensed vehicle 20 may be hazardous to the other vehicles within the predefined window 22, the program in a generate message step 56 generates a warning message. The warning message provides for example data concerning the sensed vehicle 20. In addition to displaying the warning message to the driver of the host vehicle 12, the warning message as previously noted is also converted to a standard format for vehicle mobility data in the message standard conformance step 48. The warning message is then transmitted to each of the vehicles within the predefined window 22, including the first receiving vehicle 16, the second receiving vehicle 18 and the sensed vehicle 20.

According to several aspects, a vision system may be utilized to identify the size and geometry of a vehicle in the immediate vicinity and provide that information to surrounding vehicles. In this manner, the information may be utilized for Advanced Driver Assist (ADAS) technology by utilizing sensors that are in an existing centralized vision processor.

According to several aspects, a method and system as shown in FIGS. 1-3 provide an advantage to the ADAS system by providing or enhancing relevant traffic information to surrounding vehicles also equipped with V2V communication. The system may utilize components with range map capability such as LIDAR or a Stereo Vision system to determine the relevant dimensions of a detected vehicle, categorize the measurements into relevant categories, and transmit the relevant information in relationship to global coordinates. This feature provides vehicle information to the local traffic of a DSRC host to provide a clear understanding of the remote vehicle makeup. This feature also uses geometric data captured from a secondary sensor such as LIDAR or Stereo Vision with the capability to measure vehicle attributes such as size.

According to several aspects, the system and method utilizes V2X Basic safety message information from multiple V2X enabled vehicles in a cluster of traffic to generate a steady state filter model based on the history of the tracked vehicles and generate an alert when an object vehicle develops a transient condition to the filter model. In this manner, the information can be utilized for ADAS technology by utilizing V2X capability and ADAS computing systems to predict harmful traffic conditions when they are not necessarily line-of-sight to the host driver, or to vehicles in the cluster of vehicles being tracked.

According to several aspects, a motor vehicle alert system 10 based on vehicle dynamics input includes a communication module 30 positioned in a host vehicle 12 used to receive and send vehicle data 26 in vehicle mobility data format. A tracker module 36 in communication with the communication module 30 is used to distinguish a sensed vehicle 20 and at least one other vehicle 16, 18 proximate to the host vehicle 12. A traffic hazardous condition module 38 in communication with the tracker module 36 is used to identify when a transient condition of the sensed vehicle 20 is present. A message standard conformance module 48 receives data relating the transient condition of the sensed vehicle 12 and forwards the data to the communication module 30 for transmission to the at least one other vehicle 16, 18 proximate to the host vehicle 12.

A generate message module 56 receives the data relating the transient condition and converts the data relating the transient condition to vehicle mobility data format. A traffic hazardous condition module 38 receives the data relating the transient condition and evaluates if the data relating the transient condition poses a hazardous condition to the at least one other vehicle 16, 18. A yaw rate sensor 52 can be used to determine a yaw rate of the sensed vehicle 20. An inertial measurement unit 54 can also be used to measure and identify at least an angular rate of the host vehicle 12 and the sensed vehicle 20. A list generator 34 in communication with the communication module 30 is used to generate the vehicle data as specific vehicle identification data. A track list 58 created by the list generator 34 is used to distinguish the sensed vehicle 20 from the at least one other vehicle 16, 18.

A host vehicle warning device 46 is in communication with the hazardous condition module 38. A host vehicle hazardous condition module 44 receives the data relating the transient condition from the transient condition data device 38. Upon the host vehicle hazardous condition module 44 determining that the data relating the transient condition poses a hazardous condition to the host vehicle 12 a signal from the host vehicle hazardous condition module 44 to the host vehicle warning device 46 notifies the driver of the host vehicle 12 of the transient condition. Upon the host vehicle hazardous condition module 44 determining that the data relating the transient condition does not pose a hazardous condition to the host vehicle 12 a program step returns to the tracker module 36. The communication module 30 can further include a V2X dynamics alert message data module 50 for transmitting the transient condition of the sensed vehicle 20.

The description of the invention is merely exemplary in nature and variations that do not depart from the gist of the invention are intended to be within the scope of the invention. Such variations are not to be regarded as a departure from the spirit and scope of the invention.

The following is claimed:

1. A motor vehicle alert system based on vehicle dynamics input, comprising:

a communication module positioned in a host vehicle used to receive and send vehicle data in a vehicle mobility data format;

a tracker module in communication with the communication module used to distinguish a sensed vehicle and at least one other vehicle proximate to the host vehicle;

a transient condition data device in communication with the tracker module used to identify when a transient condition of the sensed vehicle is present;

a message standard conformance module receiving data relating to the transient condition of the sensed vehicle and forwarding the data to the communication module for transmission to the at least one other vehicle proximate to the host vehicle; and a traffic hazardous condition module receiving the data relating the transient condition and evaluating if the data relating the transient condition poses a hazardous condition to the at least one other vehicle including if a path of the at least one other vehicle intersects with a path of the sensed vehicle.

2. The motor vehicle alert system of claim 1, further including a generate message module receiving the data relating the transient condition and converting the data relating the transient condition to the vehicle mobility data format.

3. The motor vehicle alert system of claim 2, further including a yaw rate sensor used to determine a yaw rate of the sensed vehicle.

4. The motor vehicle alert system of claim 2, further including an inertial measurement unit used to measure and identify at least an angular rate of the host vehicle and the sensed vehicle.

5. The motor vehicle alert system of claim 1, further including a list generator in communication with the communication module used to generate the vehicle data as specific vehicle identification data.

6. The motor vehicle alert system of claim 1, further including a track list created by the list generator used to distinguish the sensed vehicle from the at least one other vehicle.

7. The motor vehicle alert system of claim 1, wherein the communication module defines a V2X telematics communication module.

8. The motor vehicle alert system of claim 1, further including a host vehicle warning device in communication with the hazardous condition module.

9. The motor vehicle alert system of claim 8, further including a host vehicle hazardous condition module receiving the data relating the transient condition from the transient condition data device.

10. The motor vehicle alert system of claim 9, wherein upon the host vehicle hazardous condition module determining that the data relating the transient condition poses a hazardous condition to the host vehicle a signal from the host vehicle hazardous condition module to the host vehicle warning device notifies the driver of the host vehicle of the transient condition.

11. The motor vehicle alert system of claim 9, wherein upon the host vehicle hazardous condition module determining that the data relating the transient condition does not pose a hazardous condition to the host vehicle a program step returns to the tracker module.

12. The motor vehicle alert system of claim 1, wherein the communication module includes a V2X dynamics alert message data module for transmitting the transient condition of the sensed vehicle.

13. The motor vehicle alert system of claim 1, wherein a swerve condition is defined when the data relating the transient condition poses a hazardous condition to the at least one other vehicle.

14. A motor vehicle alert system based on vehicle dynamics input, comprising:

a communication module positioned in a host vehicle used to receive and send vehicle data in a vehicle mobility data format;

a list generator in communication with the communication module used to generate the vehicle data as specific vehicle identification data in a track list to distinguish a sensed vehicle and at least one other vehicle positioned proximate to the host vehicle;

a tracker module in communication with the list generator used to periodically update the vehicle data for the sensed vehicle and the at least one other vehicle;

a transient condition data device in communication with the tracker module generating data identifying when a transient condition of the sensed vehicle is present, the transient condition data device evaluating if the data relating the transient condition poses a hazardous condition to the at least one other vehicle including if a path of the at least one other vehicle intersects with a path of the sensed vehicle; and a message standard conformance module receiving the data identifying the transient condition of the sensed vehicle and forwarding the data identifying the transient condition to the communication module for transmission to the at least one other vehicle proximate to the host vehicle.

15. The motor vehicle alert system of claim 14, further including:

a list generator in communication with the communication module used to generate the vehicle data as specific vehicle identification data; and a track list created by the list generator used to distinguish the sensed vehicle from the at least one other vehicle.

16. The motor vehicle alert system of claim 14, wherein the communication module and the message standard conformance module are compatible with a vehicle-to-vehicle (V2V) communication system.

17. The motor vehicle alert system of claim 14, further including a host vehicle hazardous condition module receiving the data relating the transient condition from the transient condition data device.

18. The motor vehicle alert system of claim 17:

wherein upon the host vehicle hazardous condition module determining that the data relating the transient condition poses a hazardous condition to the host vehicle a signal from the host vehicle hazardous condition module to the host vehicle warning device notifies the driver of the host vehicle of the transient condition; and wherein upon the host vehicle hazardous condition module determining that the data relating the transient condition does not pose a hazardous condition to the host vehicle a program step returns to the tracker module.

19. A method for generating and transmitting data identifying a transient condition of motor vehicle, comprising:

providing a communication module in a host vehicle used to receive and send vehicle data in a vehicle mobility data format;

converting the vehicle data in a list generator to specific vehicle identification data in a track list to distinguish a sensed vehicle and at least one other vehicle positioned proximate to the host vehicle;

periodically updating the vehicle data for the sensed vehicle and the at least one other vehicle using a tracker module in communication with the list generator;

generating transient condition data identifying when a transient condition of the sensed vehicle is present using a transient condition data device in communication with the tracker module;

forwarding the transient condition data to a message standard conformance module in the communication module;

evaluating if the data relating the transient condition poses a hazardous condition to the at least one other vehicle including if a path of the at least one other vehicle intersects with a path of the sensed vehicle; and transmitting the transient condition data to the at least one other vehicle proximate to the host vehicle.

* * * * *